(12) United States Patent
Caldwell

(10) Patent No.: US 7,748,947 B2
(45) Date of Patent: Jul. 6, 2010

(54) WIND TURBINE

(76) Inventor: Dennis P. Caldwell, P. O. Box 1634, Pampa, TX (US) 79065

( * ) Notice: Subject to any disclaimer, the term of this patent is extended or adjusted under 35 U.S.C. 154(b) by 0 days.

(21) Appl. No.: 11/902,811

(22) Filed: Sep. 26, 2007

(65) Prior Publication Data

US 2009/0081020 A1  Mar. 26, 2009

(51) Int. Cl.
*F03D 3/02* (2006.01)

(52) U.S. Cl. .......................... 415/4.1; 415/47; 415/147; 416/41

(58) Field of Classification Search ................ 415/4.1, 415/151, 4.2, 47, 147, 905; 416/14, 41
See application file for complete search history.

(56) References Cited

U.S. PATENT DOCUMENTS

| 1,239 | A | * | 7/1839 | Evans ...................... 415/149.1 |
| 16,346 | A | * | 1/1857 | Wentworth ................. 415/4.1 |
| 310,237 | A | * | 1/1885 | Wegley ...................... 415/4.1 |
| 386,684 | A | * | 7/1888 | Bowman ..................... 415/4.1 |
| 411,550 | A | * | 9/1889 | Haberlein ................... 415/4.1 |
| 978,433 | A | * | 12/1910 | Coleman .................... 415/4.1 |
| 1,333,987 | A | * | 3/1920 | McManigal ................. 415/4.1 |
| 4,204,795 | A | * | 5/1980 | Forrest ...................... 415/905 |
| 5,009,569 | A | | 4/1991 | Hector, Sr. et al. |
| 5,038,049 | A | | 8/1991 | Kato |
| 5,348,443 | A | | 9/1994 | Roberts |
| 6,966,747 | B2 | | 11/2005 | Taylor et al. |
| 6,984,899 | B1 | | 1/2006 | Rice |
| 2005/0201855 | A1 | | 9/2005 | Fan |

FOREIGN PATENT DOCUMENTS

FR          2629523          10/1989

* cited by examiner

*Primary Examiner*—Richard Edgar
(74) *Attorney, Agent, or Firm*—Stephen R. Greiner

(57) ABSTRACT

A wind turbine for use in generating electricity. The wind turbine includes a housing being secured atop a tower. A wheel is mounted within the housing and is rotatable about a horizontal axis when struck by winds passing over the front of housing. The wheel has a hub and a number of paddles radiating outwardly from the hub and above the housing. An electrical current generator is connected to the wheel so as to be powered thereby. A wind shield is mounted within the housing for selectively preventing winds passing over the front of the housing from reaching the wheel.

4 Claims, 4 Drawing Sheets

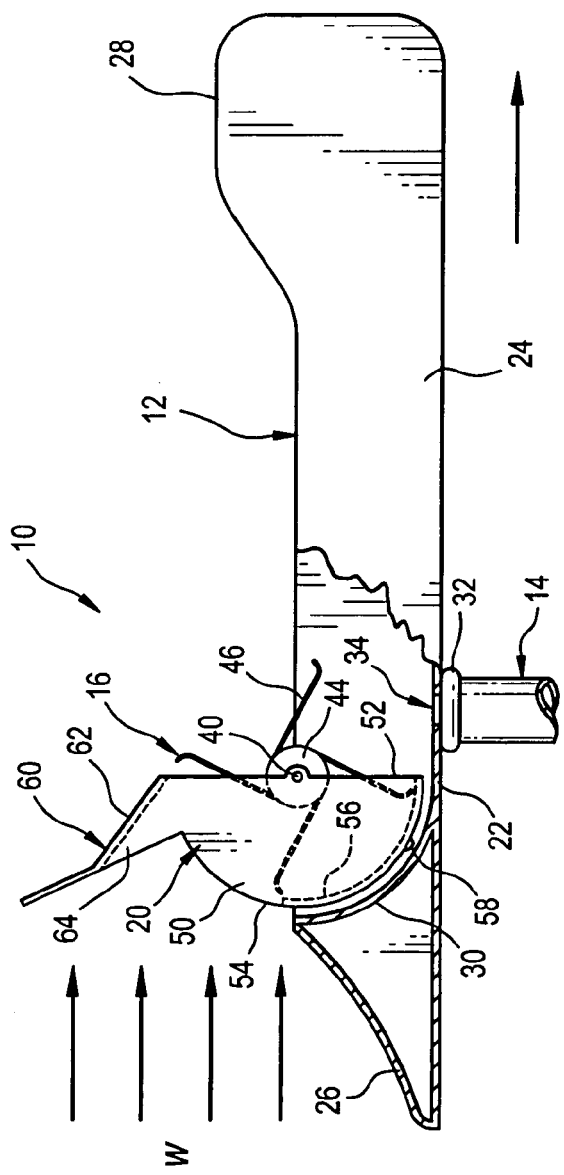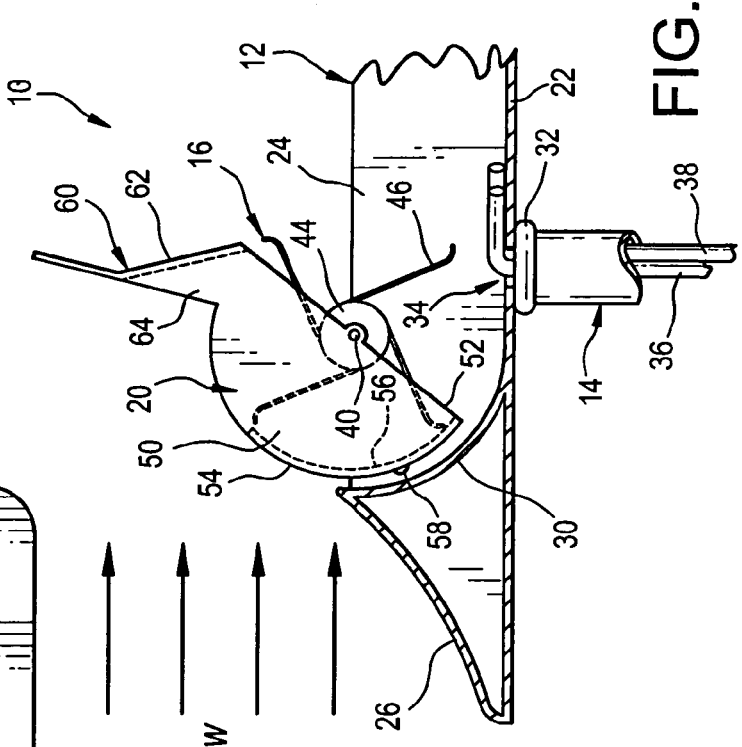

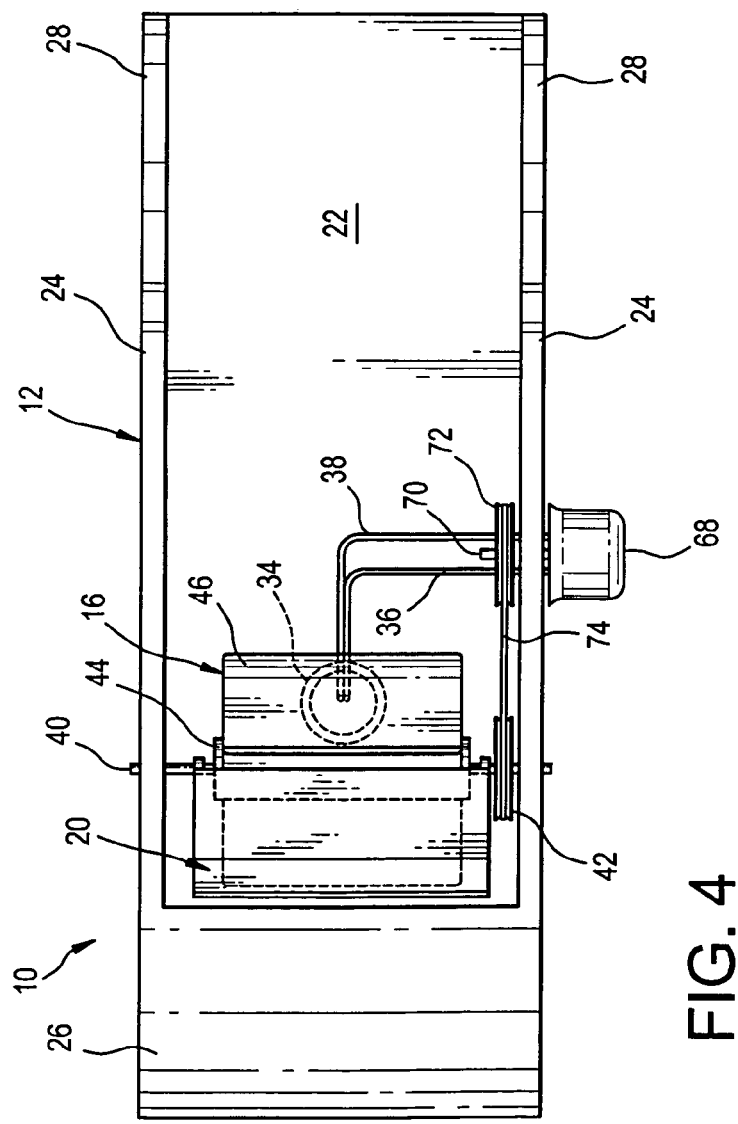
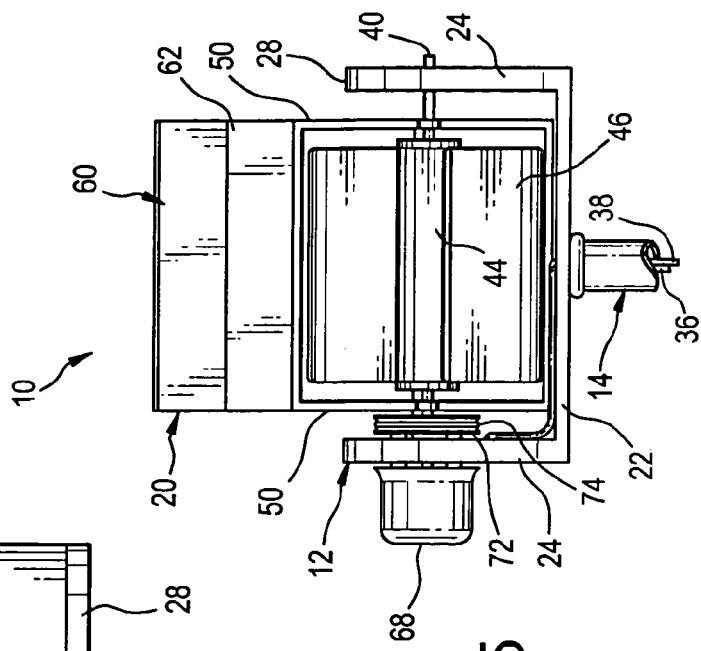

WIND TURBINE

FIELD OF THE INVENTION

The present invention relates generally to rotary kinetic fluid motors or pumps with means for controlling casing or flow guiding means in response to natural fluid current force or direction.

BACKGROUND OF THE INVENTION

A wind turbine is a device that utilizes the wind to power a machine. If the turbine is connected directly to the machine, such as a pump or a millstone, the turbine is usually referred to as a windmill. If the turbine is connected to a generator which, in turn, supplies a machine with electrical power the turbine is often referred to as a wind generator.

The most common wind turbine is one that rotates about a horizontal axis. Typical turbines of this type have a rotor shaft and an electrical generator positioned at the top of a tower and pointed into the wind. Small turbines are pointed by a wind vane whereas larger turbines generally use a wind sensor coupled with a motor.

The speed at which a wind turbine rotates must be controlled. Most importantly, speed control permits the aerodynamic efficiency of the turbine to be optomized for use in light winds. Also, speed control keeps a generator within its torque limits. Of equal importance, speed control allows a wind turbine to be slowed in high winds to prevent it from exceeding its own structural limits and those of its supporting tower. Finally, limiting the rotational speed of a turbine reduces the noise that it emits.

Speed control over a wind turbine is normally exerted by aerodynamic stalling and furling as well as electrical and mechanical braking. Stalling and furling, the preferred methods of slowing wind turbines, work by swiveling the turbine's blades so that either a flat side or an edge of the blades face into the wind. Electrical braking, however, requires the dumping energy from a generator into a resistor bank, converting the kinetic energy of the turbine's rotation into heat and causing the turbine to slow down. Mechanical, drum or disk brakes are often used to hold the turbine motionless for repair. Mechanical brakes are usually applied only after blade furling and electromagnetic braking have reduced turbine speed since mechanical brakes would wear quickly under typical loads. One major problem in designing wind turbines is getting them to slow quickly enough should a gust of wind cause sudden acceleration.

SUMMARY OF THE INVENTION

In view of the problems associated with the known apparatus employed to control the speed of wind turbines, it is a principal object of the invention to provide a wind turbine whose speed is easily and automatically controlled. In the event of strong gusts, the turbine is automatically prevented from entering an over-speed condition that could otherwise be damaging.

It is an object of the invention to provide improved features and arrangements thereof in a wind turbine for the purposes described which is relatively lightweight in construction, inexpensive to manufacture, and fully dependable in use.

Briefly, the wind turbine in accordance with this invention achieves the intended objects by featuring a housing secured atop a tower. A wheel is mounted within the housing and is rotatable about a horizontal axis when struck by winds. The wheel has a hub and a number of paddles radiating outwardly from the hub above the housing. An electrical current generator is connected to the wheel so as to be powered thereby. A wind shield is mounted within the housing for selectively preventing winds from reaching the wheel. The wind shield has a deflector plate that is normally positioned within the housing between the front of the housing and the wheel. The deflector plate is pivotally secured to the housing. A lever arm extends upwardly from the deflector plate and above the housing. A vane is affixed atop of the lever arm for pivoting the deflector plate upwardly when high winds strike the vane.

The foregoing and other objects, features, and advantages of my wind turbine will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 2 is a side elevational view of the wind turbine of FIG. 1 with portions broken away to reveal details thereof.

FIG. 3 is a side elevational view of the wind turbine with portions broken away and the wind deflector being pivoted to block moving air from contacting the rotating wheel.

FIG. 4 is a top view of the wind turbine.

FIG. 5 is a rear view of the wind turbine.

Similar reference characters denote corresponding features consistently throughout the accompanying drawings.

DETAILED DESCRIPTION OF THE WIND TURBINE

Figure 1:
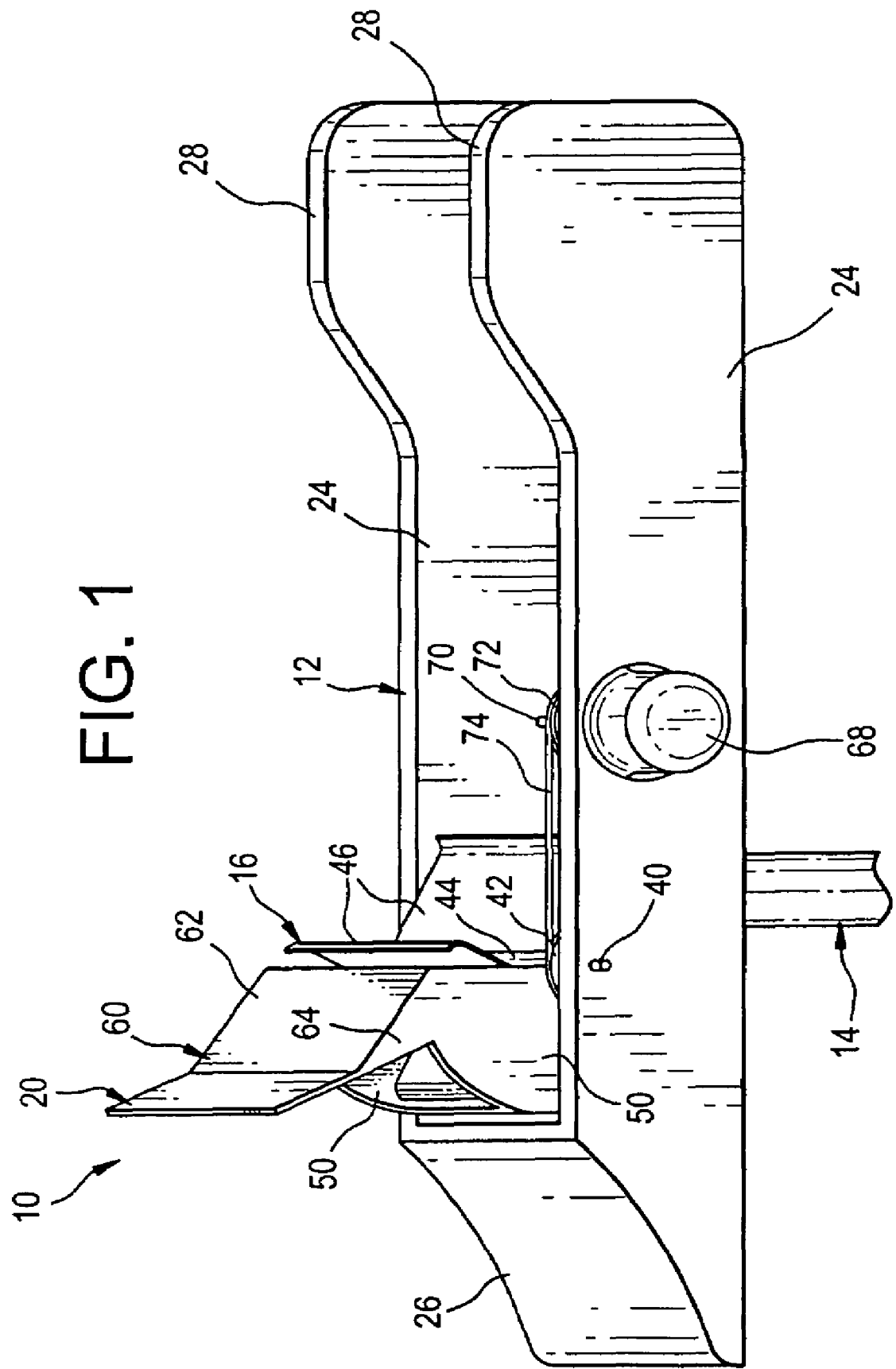
FIG. 1 is a perspective view of a wind turbine in accordance with the present invention.
Figure 6:
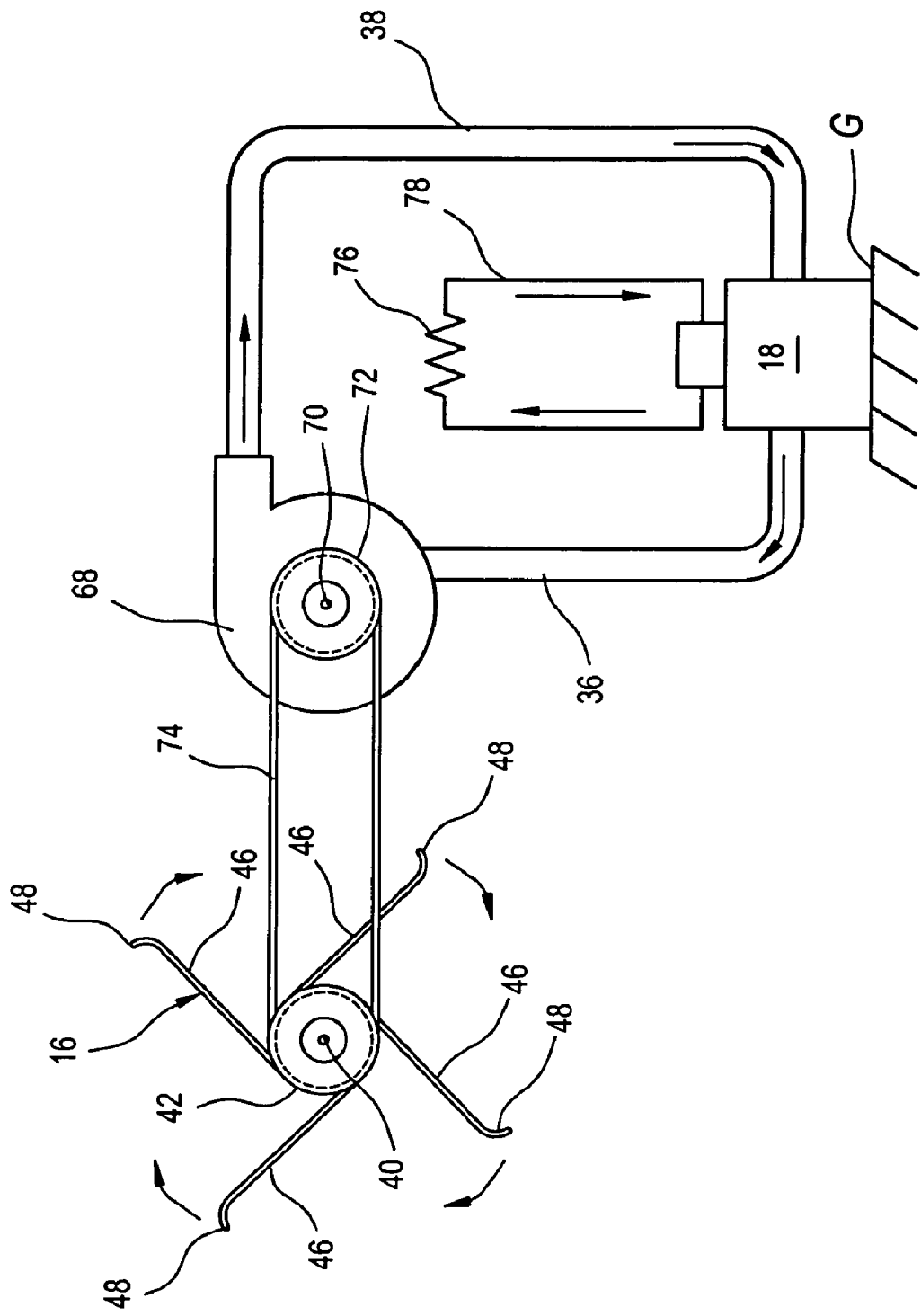
FIG. 6 is a diagrammatic view of a power generating system employing the wind turbine.

Referring now to the FIGS., a wind turbine in accordance with the present invention is shown at 10. Turbine 10 includes a housing 12 secured atop a tower 14. A wheel 16 is mounted within housing 12 and is rotatable about a horizontal axis when struck by winds W passing over the front of housing 12. Wheel 16 is connected to, and drives, an electrical current generator 18 positioned on the ground G adjacent tower 14. To prevent wheel 16 from attaining an over-speed condition, a wind shield 20 is mounted in the front of housing 12 to divert overly strong winds W away from wheel 16.

Housing 12 includes a rectangular bottom wall 22 to the opposite sides of which a pair of side walls 24 is connected and extends upwardly. The front ends of side walls 24 slope upwardly and rearwardly from their junctions with bottom wall 22 at an acute angle. A front wall 26 is connected to the respective front ends of bottom wall 22 and side walls 24 and is supported by side walls 24 at an acute angle. The rear end of each of side walls 24 is provided with an upward extension 28 so as to serve as a rudder in winds W. Thus, housing 12 has an open top and rear.

To reinforce front wall 26, housing 12 is provided with a brace 30. Brace 30 is connected at its top to the top of front wall 26 and at its bottom to bottom wall 22 at a point rearward of front wall 26. The opposite sides of brace 30 are connected to side walls 24. Brace 30 is concave and forms a forwardly and upwardly arcing ramp within housing 12.

Bottom wall 22 is connected by means of a swivel 32 to the top of tower 14. As shown, swivel 32 is positioned midway between side walls 24 for balance. Also, swivel 32 is positioned sufficiently close to front wall 26 such that winds W will always swing side wall extensions 28 downwind and cause front wall 26 to face directly into winds W.

Swivel 32 has an opening 34 in its center that permits a pair of conduits 36 and 38, discussed in detail hereinbelow, to extend from housing 12 downwardly to generator 18 in a protected manner. Alternatively, conduits 36 and 38 could extend from housing 12 outside of tower 14, but such an arrangement could interfere with the swiveling of housing 12 and expose conduits 36 and 38 to weathering.

Wheel 16 has an axle 40 whose opposite ends are journaled within the tops of side walls 24 rearwardly of front wall 26. A pulley 42 is mounted at one of the opposite ends of axle 40 for rotation therewith. A hub 44 is mounted upon axle 40 adjacent pulley 42 for rotation with axle 40 and pulley 42. A number of paddles 46 is affixed to, and extends radially outward from, hub 44 to catch winds W. Each paddle 46 has a width that is substantially equal to the distance between side walls 24 and has a height that is substantially equal to the height of side walls 24. The free ends 48 of paddles 46 curve forwardly for optimum wind-catching efficiency.

The configuration of housing 12 and wheel 16 ensures that winds W only contact paddles 46 extending upwardly from housing 12, above side walls 24 and front wall 26 at a given point in time. Front wall 26 diverts winds W upwardly so that they cannot contact paddles 46 positioned directly between side walls 24 and rob wheel 16, once caused to rotate by winds W, of angular momentum.

Wind shield 20 is secured to housing 12 for movement when winds W are of sufficient strength to require that the speed of wheel 16 be reduced or maintained at its high limit. Wind shield 20 has a pair of semicircular side plates 50 each of which is pivotally mounted to a respective one of the opposite ends of axle 40 between side walls 24. Each of side plates 50 has a linear back edge 52, adjacent which axle 40 passes, and an opposing arcuate edge 54 adjacent which brace 30 is positioned. An arcuate deflector plate 56 is affixed to, and connects together, the arcuate edges 54 of side plates 50. Deflector plate 56 has a height that is substantially the same as that of side walls 24. A weight 58 affixed to the bottom of deflector plate 56 ensures that deflector plate 56 is normally positioned out of the flow of winds W directly behind front wall 26.

Wind shield 20 has a wind gauge 60 at its top for automatically rotating deflector plate 56 upwardly when excessively high winds W present themselves. As illustrated, gauge 60 includes a first vane 62 that is affixed to the respective tops of side plates 50 by means of a pair of lever arms 64, each being integrally formed with the top of a respective one of side plates 50. Vane 62 is positioned so as to normally slope downwardly and rearwardly at an arcuate angle toward the top of wheel 16 and divert winds W downwardly toward any upturned paddles 46. A second vane 66 is affixed at its bottom to the top of vane 62 and is positioned so as to normally slope downwardly and rearwardly at a steeper angle than vane 62. Vane 66 also diverts a component of winds W toward any upturned paddles 46.

Vanes 62 and 66 are sized and oriented so as to pivot deflector plate 56 upwardly when contacted by a wind having a predetermined velocity that is harmful to the operation of wind turbine 10. Larger vanes 62 and 66, that present a greater surface area to the flow, will cause deflector plate 56 to shield paddles 46 when winds W have a relatively low velocity. Smaller vanes 62 and 66, however, will only pivot wind shield 20 to elevate deflector plate 56 when the velocity of winds W is relatively high. Fine adjustments to the movement of wind shield 20 are made varying the mass of weight 58.

A hydraulic fluid pump 68 is affixed to one of side walls 24 rearwardly of wheel 16. Pump 68 has a drive shaft 70 fitted with a pulley 72 positioned within housing 12. A belt 74 extends snugly around pulleys 42 and 72 and transmits the kinetic energy from the rotating wheel 16 to pump 68.

Pump 68 is connected to an inlet conduit 36 and a discharge conduit 38 that respectively bring unpressurized hydraulic fluid to pump 68 and carry pressurized hydraulic fluid away from pump 68. The terminal ends of conduits 36 and 38 are connected to electrical current generator 18, through which hydraulic fluid is circulated. Pressurized hydraulic fluid delivered to generator 18 via conduit 38 causes generator 18 to produce an electrical current sufficient to power devices, represented by a resistor 76 in the FIGS., through an electrical grid 78. Unpressurized hydraulic fluid is returned to pump 68 via conduit 36 to complete a closed circuit.

Wind turbine 10 operates automatically after its set up in a location where winds W blow with a suitable consistency and velocity. With winds W blowing, extensions 28 serve to orient front wall 26 so that it faces directly into winds W. Winds W pass over front wall 26 and strike any paddles 46 projecting above front wall 26 thereby rotating wheel 16, driving pump 68, and powering generator 18. Electricity produced by generator 18 energizes remote electrical devices producing useful work.

Should winds W have a velocity that is predetermined by an operator to be excessive or otherwise harmful to wind turbine 10, wind shield 20 will be automatically rotated so as to elevate deflector plate 56. When in a fully raised position, deflector plate 56 prevents strong winds W from contacting paddles 46 and rotating wheel 16 thus shutting down wind turbine 10. In lesser winds W, deflector plate 56 only partially shields paddles 46 thereby permitting wind turbine 10 to operate.

While wind turbine 10 has been described with a high degree of particularity, it will be appreciated by those skilled in the art that modifications can be made to it. Therefore, it is to be understood that the present invention is not limited merely to wind turbine 10 described above, but encompasses any and all wind turbines within the scope of the following claims.

I claim:

1. A wind turbine, comprising:
   a tower;
   a housing being pivotally secured atop said tower, said housing including:
   a bottom wall having opposite sides;
   a pair of side walls, each of which being affixed to a respective one of said opposite sides of said bottom wall, and each of which having a front end and a rear end, and each of which further having an upward extension at said rear end thereof serving as a rudder in passing winds; and
   a front wall being affixed to said front ends of said side walls, said front wall being inclined so as to slope upwardly and rearwardly toward said upward extensions;
   a wheel being mounted within said housing between said front ends and rear ends of said side walls and being rotatable about a horizontal axis when struck by winds passing over said front wall of said housing, said wheel having a hub and a plurality of paddles radiating outwardly from said hub and above said front wall of said housing;
   an electrical current generator being affixed to said housing and being connected to said wheel so as to be powered thereby; and, a wind shield being mounted within said housing for selectively preventing winds passing over said front wall of said housing from reaching said wheel, said wind shield including:
- a pair of semicircular side plates each having a linear back edge and an opposing arcuate edge;
- a deflector plate being normally positioned within said housing between said front wall of said housing and said wheel, said deflector plate connecting together the arcuate edges of the side plates and being pivotally secured to said housing;
- a lever arm extending upwardly from said deflector plate and above said housing; and,
- a first vane being affixed atop of said lever arm for pivoting said deflector plate upwardly and above said front wall of said housing when high winds strike said first vane.

2. The wind turbine according to claim 1 wherein said first vane is oriented so as to normally slope downwardly and rearwardly at an arcuate angle toward the top of said wheel and divert winds downwardly toward said paddles.

3. The wind turbine according to claim 2 further comprising a second vane affixed atop said first vane, said second vane being normally oriented so as to normally slope downwardly and rearwardly toward said wheel at a steeper angle than that of said first vane.

4. The wind turbine according to claim 1 wherein said electrical current generator is affixed to, and carried by, one of said side walls of said housing.

* * * * *